United States Patent Office 3,449,355
Patented June 10, 1969

3,449,355
2-[(3,4-DIHALOPHENOXY)METHYL]-
2-IMIDAZOLINE
Halbert C. White, Midland, Mich., assignor to The Dow
Chemical Company, Midland, Mich., a corporation of
Delaware
No Drawing. Filed Apr. 4, 1967, Ser. No. 628,301
Int. Cl. C07d 49/34; A61k 27/00
U.S. Cl. 260—309.6       5 Claims

ABSTRACT OF THE DISCLOSURE

New 2-[(3,4 - dihalophenoxy)methyl] - 2 - imidazoline compounds, and their pharmaceutically-acceptable salts such as the hydrochlorides. The compounds are active as analgesics and antidepressants.

---

This invention is concerned with aryloxyimidazolines and is particularly directed to 2-[(3,4-dihalophenoxy)-methyl]-2-imidazolines and the pharmaceutically-acceptable salts thereof having the formula:

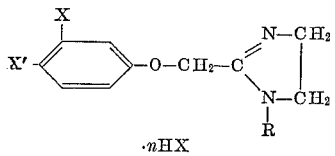

In the present specification and claims, R represents hydrogen or methyl, X and X' each independently represent chlorine or bromine, $n$ represents an integer from zero to one and HX represents the anionic moiety of a pharmaceutically-acceptable salt. The term "pharmaceutically-acceptable salt" as herein employed refers to salts of a 2-[(3,4-dihalophenoxy)methyl]-2-imidazoline which are substantially non-toxic at dosages consistent with good pharmacological activity. Such pharmaceutically-acceptable salts include non-toxic acid addition salts with inorganic acids such as hydrochloric, hydrobromic, sulfuric or phosphoric acid, or with organic acids such as acetic, succinic, malic, maleic, tartaric or citric acid, or with organic sulfonic acids such as methanesulfonic or p-toluenesulfonic acid. The 2-[(3,4-dihalophenoxy)methyl]-2-imidazoline compounds are crystalline solids which are of varying degrees of solubility in organic solvents such as 1,2-dichlorobenzene, methylene chloride and alcohols and only slightly soluble in water. The pharmaceutically-acceptable salts of the 2-[(3,4-dihalophenoxy)methyl]-2-imidazolines such as the hydrochloride are soluble in water and slightly soluble in organic solvents such as acetone, benzene and alcohols.

The novel 2-[(3,4-dihalophenoxy)methyl]-2-imidazoline compounds have been found to be useful for administration to laboratory animals in studying the behavior thereof and in studying drug effects on the central and peripheral nervous system. The compounds are particularly useful as antidepressants. For such uses, the preferred form of the 2-[(3,4 - dihalophenoxy)methyl] - 2-imidazoline compounds is a pharmaceutically-acceptable salt thereof and the hydrochloride salts are preferred. Other salts, and particularly the tosylate (p-toluenesulfonate), can also be used in the preparation and purification of the compounds and can be converted to the preferred hydrochloride salt. The compound wherein R is hydrogen and X and X' are both chlorine is especially preferred as an antidepressant and as an analgesic.

The compounds of the invention wherein R is hydrogen are prepared by the reaction of a 3,4-dihalophenoxyacetonitrile with ethylenediamine monotosylate to form a 2-[(3,4-dihalophenoxy)methyl]-2-imidazoline tosylate, and the subsequent hydrolysis of the 2-[(3,4-dihalophenoxy)methyl]-2-imidazoline in the free base form. The reaction proceeds with the evolution of ammonia when the reactants are contacted and mixed, preferably in an inert organic solvent as a reaction medium. Representative and suitable inert organic solvents which can be employed as reaction media include alkylbenzenes such as xylenes and halobenzenes such as dichlorobenzene, the preferred solvent being 1,2-dichlorobenzene. The reaction is preferably carried out under an inert atmosphere and proceeds readily at temperatures from about 150° to about 180° C. The reaction is preferably carried out under reflux at the boiling temperature of the reaction mixture. In the preferred procedure, an inert gas is directed through the reaction mixture to carry off ammonia of reaction. The 2-[(3,4-dihalophenoxy)methyl]-2-imidazoline product precipitates in the reaction mixture as its tosylate (p-toluenesulfonate) salt and the salt can be separated by conventional methods as filtration, centrifugation or decantation. The tosylate salt can be converted to the free base form by hydrolysis in aqueous base. The free base 2-[(3,4-dihalophenoxy)methyl]-2-imidazoline is then separated by extraction with an organic solvent such as methylene chloride or chloroform, followed by evaporation of the solvent. The product can be purified by conventional methods such as crystallization or it can be converted to a pharmaceutically-acceptable salt. Alternatively, the 2-[(3,4-dihalophenoxy)methyl]-2-imidazoline tosylate can be purified by conventional procedures such as recrystallization and washing and employed as an antidepressant.

The novel compounds wherein R is methyl are prepared by N-methylation of the novel compounds wherein R is hydrogen with methyl sulfate. The reaction proceeds when the reactants are contacted and mixed, preferably in the presence of water as a solvent. The exact proportions of the reactants to be employed are not critical, some of the desired product being produced when the reactants are mixed in any proportions. However, the reaction consumes equimolar amounts of the reactants, and the reactants are preferably employed in equimolar proportions. The reaction proceeds at temperatures of from about 25° to 75° C. Heat is evolved in the initial stages of the reaction and the evolved heat is generally sufficient to bring the reaction mixture to a temperature within the reaction temperature range. The reaction mixture is held at a temperature within the reaction temperature range for up to 2–3 hours. At the end of the reaction period, the mixture is made strongly basic by the addition of sodium hydroxide. The product is then extracted with a chlorinated hydrocarbon solvent. The 1-methyl-2-[(3,4-dihalophenoxy)methyl]-2-imidazoline product can be separated by conventional methods such as evaporation of the solvent. The product can be further purified by conventional methods such as recrystallization or it can be converted to a pharmaceutically-acceptable salt.

The pharmaceutically-acceptable salts of the 2-[(3,4-dihalophenoxy)methyl] - 2 - imidazoline can be prepared by dissolving the free base in a minimal amount of alcohol and adding an alcohol solution of an acid such as hydrochloric acid, hydrobromic acid, malic acid, maleic acid or succinic acid until precipitation of the corresponding salt is complete. The salt can further be purified by recrystallization or converted to the free base form of 2-[(3,4-dihalophenoxy)methyl]-2-imidazoline.

The free base 2-[(3,4-dihalophenoxy)methyl]-2-imidazoline can be prepared by hydrolysis of the salt in aqueous base. The salt is mixed with a molar equivalent amount of sodium hydroxide in aqueous solution, after which the free base can be separated by extraction with a chlorinated hydrocarbon solvent. The solvent can be removed by conventional methods such as evaporation or distillation and the 2-[(3,4-dihalophenoxy)methyl]-2-imidazoline can be purified by methods such as recrystallization.

In preparing the compounds of the invention wherein R is hydrogen, a 3,4-dihalophenoxyacetonitrile, ethylenediamine monotosylate and an inert organic solvent, preferably 1,2-dichlorobenzene, are mixed together. The exact proportions of the reactants to be employed are not critical, some of the desired product being obtained when the reactants are combined in any proportions. However, the reaction consumes the reactants in equimolar proportions and the use of the reactants in such proportions is preferred. Nitrogen is directed through the mixture and the mixture is heated to a temperature within the reaction temperature range for about 1 to 10 hours. In a convenient procedure, the reaction vessel is vented to a trap containing aqueous hydrochloric acid to react with the ammonia of reaction. The reaction mixture is then cooled and filtered. The 2 - [(3,4 - dihalophenoxy)-methyl]-2-imidazoline tosylate filter cake can be further purified by recrystallization or it can be converted to the free base by hydrolysis in aqueous base.

In preparing the compounds wherein R is methyl, a compound wherein R is hydrogen is slurried in water and dimethylsulfate is added to the slurry. The temperature of the mixture generally increases during the addition, and the mixture is heated to maintain the reaction mixture at a temperature within the reaction temperature range throughout the reaction period. Aqueous sodium hydroxide is then added, preferably until the pH of the mixture is about 12–13, and the resulting mixture is extracted with methylene chloride. The methylene chloride extract is evaporated to obtain the 1-methyl-2-[(3,4-dihalophenoxy)methyl]-2-imidazoline product as a residue. The product is preferably further purified by converting it to a pharmaceutically-acceptable salt and purifying the salt by recrystallization.

The following examples illustrate the invention but are not to be construed as limiting the same.

Example 1

3,4-dichlorophenoxyacetonitrile (20.2 grams; 0.10 mole) was mixed with ethylenediamine monotosylate (23.5 grams; 0.10 mole) and 75 milliliters of 1,2-dichlorobenzene. Nitrogen gas was directed through the mixture while the mixture was heated at the boiling temperature under reflux for three hours. The ammonia of reaction was collected by passing the exit gases through a gas scrubber containing dilute aqueous hydrochloric acid. The reaction mixture was cooled and filtered to obtain 2-[(3,4-dichlorophenoxy)methyl] - 2 - imidazoline tosylate, having a molecular weight of 417.3, as a filter cake. The 2 - [(3,4 - dichlorophenoxy)methyl] - 2 - imidazoline tosylate filter cake was mixed with a mixture of methylene chloride and water to form a slurry and the slurry was made basic by the addition of about 0.10 mole of sodium hydroxide in aqueous solution. The organic layer was separated and evaporated in vacuo to leave 2-[(3,4-dichlorophenoxy)methyl] - 2 - imidazoline, having a molecular weight of 245.1, as a residue. The 2-[(3,4-dichlorophenoxy)methyl] - 2 - imidazoline was dissolved in 100 milliliters of isopropyl alcohol. The alcohol solution was acidified by the addition of 5 normal hydrochloric acid in isopropyl alcohol until precipitation was complete. The mixture was filtered and the 2-[(3,4-dichlorophenoxy)methyl]-2-imidazoline hydrochloride product was collected as a filter cake and found to melt at 244°–245° C. The product was found to have a neutral weight of 280 as compared with the equivalent weight of 281.5 calculated for the named structure. The structure of the product was confirmed by nuclear magnetic resonance spectroscopy.

In substantially the same procedure described above, employing similar inert organic solvents and substituting for the hydrochloric acid an acid capable of forming a pharmaceutically-acceptable salt, the following 2-[(3,4-dichlorophenoxy)methyl]-2-imidazoline salts are prepared.

2 - [(3,4 - dichlorophenoxy)methyl] - 2 - imidazoline hydrobromide, having a molecular weight of 326, is prepared by substituting hydrobromic acid in lieu of the hydrochloric acid in the procedure described above.

2-[(3,4 - dichlorophenoxy)methyl] - 2 - imidazoline sulfate, having a molecular weight of 343.2, is prepared by substituting sulfuric acid in lieu of the hydrochloric acid in the procedure described above.

2 - [(3,4 - dichlorophenoxy)methyl] - 2 - imidazoline succinate, having a molecular weight of 363.2, is prepared by substituting succinic acid in lieu of the hydrochloric acid in the procedure described above.

2 - [(3,4 - dichlorophenoxy)methyl] - 2 - imidazoline maleate, having a molecular weight of 361.2, is prepared by substituting maleic acid in lieu of the hydrochloric acid in the procedure described above.

2 - [(3,4 - dichlorophenoxy)methyl] - 2 - imidazoline malate, having a molecular weight of 379.2, is prepared by substituting malic acid in lieu of the hydrochloric acid in the procedure described above.

Example 2

3.4-dibromophenoxyacetonitrile (0.1 mole) was mixed with ethylenediamine monotosylate (0.1 mole) and 100 milliliters of 1,2-dichlorobenzene. Nitrogen gas was directed through the mixture while the mixture was heated at a temperature of about 180° C. for about 3 hours. The ammonia of reaction was collected by passing the exit gases through a gas scrubber containing dilute aqueous hydrochoric acid. The reaction mixture was cooled and filtered to obtain 2-[(3,4-dibromophenoxy)methyl]-2-imidazoline tosylate, having a molecular weight of 506.2, as a filter cake. The filter cake was mixed with a mixture of methylene chloride and water to form a slurry and the slurry was made basic by the addition of about 0.10 mole of sodium hydroxide in aqueous solution. The organic layer was separated and evaporated in vacuo to leave 2-[(3,4-dibromophenoxy)methyl]-2-imidazoline, having a molecular weight of 334, as a residue. The 2-[(3,4-dibromophenoxy)methyl]-2-imidazoline was dissolved in about 100 milliliters of isopropyl alcohol. The alcohol solution was acidified by the addition of 5 normal hydrochloric acid in isopropyl alcohol until precipitation was complete. The mixture was filtered and the 2-[3,4-dibromophenoxy)methyl] - 2 - imidazoline hydrochloride product was collected as a filter cake and found to melt at 262°–263° C.

In substantially the same procedure described above and employing similar inert organic solvents, 2-[(3-bromo-4-chlorophenoxy)methyl] - 2 - imidazoline hydrochloride, having a molecular weight of 326, is prepared by substituting 3-bromo-4-chlorophenoxyacetonitrile for the 3,4-dibromophenoxyacetonitrile in the procedure described above.

Example 3

2 - [(3,4 - dichlorophenoxy)methyl] - 2 - imidazoline (24.5 grams; 0.10 mole) was slurried in 50 milliliters of water and dimethylsulfate (9.6 milliliters; 0.10 mole) was added to the slurry with stirring. The temperature of the mixture rose from 25° to 55° C. and the mixture was then held at 55° C. for one hour. Aqueous sodium hydroxide was added to bring the pH of the mixture to about 13. The mixture was extracted with methylene chloride and the extracts were evaporated in vacuo. The residue was dissolved in a minimal amount of isopropyl alcohol and an isopropyl alcohol solution of hydrochloric acid was added until precipitation was complete. The 1 - methyl - 2 - [(3,4 - dichlorophenoxy)methyl] - 2 - imidazoline hydrochloride product was recrystallized from ethanol and found to melt at 238°–240° C. The structure of the product was confined by nuclear magnetic resonance analysis.

In substantially the same procedure, 1-methyl-2-[(3,4-dibromophenoxy)methyl]-2-imidazoline hydrochloride, having a molecular weight of 384.4, is prepared by mixing together equimolar proportions of 2-[(3,4-dibromophenoxy)methyl]-2-imidazoline and dimethysulfate and treating the reaction product with hydrochloric acid.

Example 4

The novel 2-[(3,4-dihalophenoxy)methyl]-2-imidazoline compounds have utility as antidepressants as indicated by their antagonism to barbiturate-induced sedation in small rodents. This activity was indicated by their effectiveness in decreasing hexobarbital sleep time in mice. For purposes of comparison, other aryloxy-imidazolines were also tested. In these determinations, separate groups of mice received a dosage of one of the compounds at a rate of 1, 5 or 25 milligrams per kilogram one hour before intraperitoneal administration of hexobarbital at a dosage rate of 100 milligrams per kilograms. Separate groups of untreated mice were similarly injected with hexobarbital at a dosage rate of 100 milligrams per kilogram to serve as checks. The hexobarbital injections induced sleep in the mice. All the animals were then placed on their backs and the period of time until each mouse turned over and righted itself was recorded as sleep time. The ratio of the average sleep time for the treated mice to that for the untreated mice is expressed as hexobarbital sleep time ratio in the following table.

TABLE I

| Compound | Dosage level, milligrams per kilogram | Hexobarbital sleep time ratio |
| --- | --- | --- |
| 2-[(3,4-dichlorophenoxy)-methyl]-2-imidazoline hydrochloride | 25 | 0.37 |
| 2-[(3,4-dibromophenoxy)-methyl]2-imidazoline hydrochloride | 25 | 0.72 |
| 2-[(3-methyl-4-chlorophenoxy)-methyl]-2-imidazoline hydrochloride | 25 | 1.33 |
| 2-[(3-chlorophenoxy)methyl]-2-imidazoline hydrochloride | 1 | 1.29 |
| 2-[(4-chlorophenoxy)methyl]-2-imidazoline hydrochloride | 5 | 1.20 |

Example 5

2 - [(3,4 - dichlorophenoxy)methyl] - 2 - imidazoline also has central nervous system activity as indicated by its effectiveness in increasing the effects of d-amphetamine in mice. In these operations, groups of mice were administered 2-[(3,4-dichlorophenoxy)methyl]-2-imidazoline hydrochloride at a dosage rate of 25 milligrams per kilogram by intraperitoneal injection. About 45 minutes after the administration of the test compound the mice were administered 20 milligrams per kilogram of d-amphetamine sulfate by intraperitoneal injection. Immediately after the administration of amphetamine, the mice were aggregated by confining them in a cage small enough to maintain the mice in close proximity to one another. Similar groups of mice were similarly administered known aryloxyimidazoline compounds at dosage rates of 10 or 25 milligrams per kilogram, similarly treated with amphetamine and aggregated for comparison. A separate group of mice not pretreated with an aryloxy-imidazoline compound was similarly treated with amphetamine and aggregated to serve as a check. The administration of 20 milligrams per kilogram of amphetamine to mice not pretreated with a compound having central nervous system activity normally results in hyper-excitement, tremors and fighting in the aggregated mice, followed by death of the mice within about three hours. The ratio of the number of mice surviving for three hours to the total number of mice treated with an aryloxyimidazoline compound is expressed as percentage amphetamine antagonism in Table II.

TABLE II

| Compound | Dosage level, milligrams per kilogram | Amphetamine antagonism (percent) |
| --- | --- | --- |
| 2-[(3,4-dichlorophenoxy)-methyl]-2-imidazoline hydrochloride | 25 | 1 0 |
| 2-[(2,4-dichlorophenoxy)-methyl]-2-imidazoline hydrochloride | 10 | 50 |
| 2-[(3-methyl-4-chloro-phenoxy)methyl]-2-imidazoline hydrochloride | 25 | 75 |

¹ The mice administered 2-[(3,4-dichlorophenoxy)-methyl]-2- imidazoline hydrochloride survived for a much shorter period of time than the check mice, indicating that 2-[(3,4-dichlorophenoxy)-methyl]-2-imidazoline hydrochloride enhanced the effect of amphetamine.

In similar operations, a group of 10 mice (A) was simultaneously administered 2-[(3,4-dichlorophenoxy)-methyl]-2-imidazoline hydrochloride at a dosage rate of 25 milligrams per kilogram and d-amphetamine sulfate at a dosage rate of 5 milligrams per kilogram by intraperitoneal injection. A similar group of mice (B) was administered d-amphetamine sulfate alone at a dosage rate of 5 milligrams per kilogram. This dosage rate of amphetamine normally is of minimal toxicity in untreated mice. Two other groups of 10 mice (C) and (D) each were administered 31 and 40 milligrams per kilogram, respectively, of 2-[(3,4-dichlorophenoxy)methyl]-2-imidazoline hydrochloride. The four groups of mice were aggregated in small cages substantially as described above. The percentage of deaths for each group of mice is expressed as percent mortality in Table III.

TABLE III

| Test group | Compound administered | Dosage rate, milligrams per kilogram | Percent mortality |
| --- | --- | --- | --- |
| A | 2-[(3,4-dichlorophenoxy)-methyl]-2-imidazoline hydrochloride and d-Amphetamine sulfate | 25 5 | 100 |
| B | d-Amphetamine sulfate | 5 | 10 |
| C | 2-[(3,4-dichlorophenoxy)-methyl]-2-imidazoline hydrochloride. | 31 | 0 |
| D | do | 40 | 0 |

In other operations, the intraperitoneal dosage of representative 2 - [(3,4 - dihalophenoxy)methyl] - 2 - imidazoline compounds effective to reverse the antagonism of the anti-convulsant effects of diphenylhydantoin by reserpine in 60 percent of the mice tested ($ED_{50}$) was calculated. The $ED_{50}$ for reversal of the effect of reserpine by 2-[(3,4-dichlorophenoxy)methyl]-2-imidazoline hydrochloride was dtermined to be 0.49 milligram per kilogram. The $ED_{50}$ for 2-[(3,4-dibromophenoxy) methyl-2-imidazoline hydrochloride was determined to be 23 milligrams per kilogram. The $ED_{50}$ for 1-methyl-2-[(3,4 - dichlorophenoxy)methyl] - 2 - imizadoline hydrochloride was 8.2 milligrams per kilogram.

In other operations, the 50 percent effective dosages ($ED_{50}$) of 2-[3,4-dichlorophenoxy)-methyl]-2-imidazoline hydrochloride for protection against the characteristic writhing induced by the intraperitoneal injection of 0.01 milliliter per gram of aqueous 0.1 percent hydrochloric acid were determined to be 11.7 milligrams per kilogram by subcutaneous injection and 31.5 milligrams per kilogram administered orally.

The 3,4-dichlorophenoxyacetonitrile employed as a starting material herein is prepared by known methods. In a representative operation, 3,4-dichlorophenol (81.5 grams; 0.50 mole) was mixed with 40 grams of chloroacetonitrile, 98 grams of anhydrous potassium carbonate and 100 milliliters of dimethyl sulfoxide. The mixture was held at a temperature of 75° C. for three hours, after which it was cooled and diluted by the addition of about 2 liters of water. A precipitate formed on the addition of the water and the mixture was filtered and the filtrate discarded. The filter cake was recrystallized from cyclohexane and the 3,4-dichlorophenoxyacetonitrile product was found to melt at 61°–62° C.

I claim:
1. A member of the group consisting of a 2-[(3,4-dihalophenoxy)methyl]-2-imidazoline compound corresponding to the formula

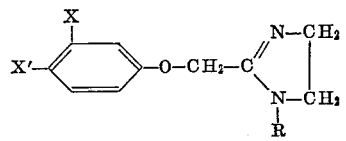

wherein R represents a member of the group consisting of hydrogen and methyl and X and X' each independently represent a member of the group consisting of chlorine and bromine, and a pharmaceutically-acceptable salt.

2. The compound of claim 1 wherein the compound is 2-[(3,4-dichlorophenoxy)methyl]-2-imidazoline.

3. The compound of claim 1 wherein the compound is 2-[3,4-dichlorophenoxy)methyl] - 2 - imidazoline hydrochloride.

4. The compound of claim 1 wherein the compound is 2 - [(3,4 - dichlorophenoxy)methyl] - 2 - imidazoline p-toluenesulfonate.

5. The compound of claim 1 wherein the compound is 1 - methyl - 2 - [(3,4 - dichlorophenoxy)methyl] - 2-imidazoline hydrochloride.

References Cited

Julia: Bul. Soc. Chim., France, vol. 23, pages 1365–7 (1956).

HENRY R. JILES, *Primary Examiner.*

N. TROUSOF, *Assistant Examiner.*

U.S. Cl. X.R.

260—465, 999